Figure 1:
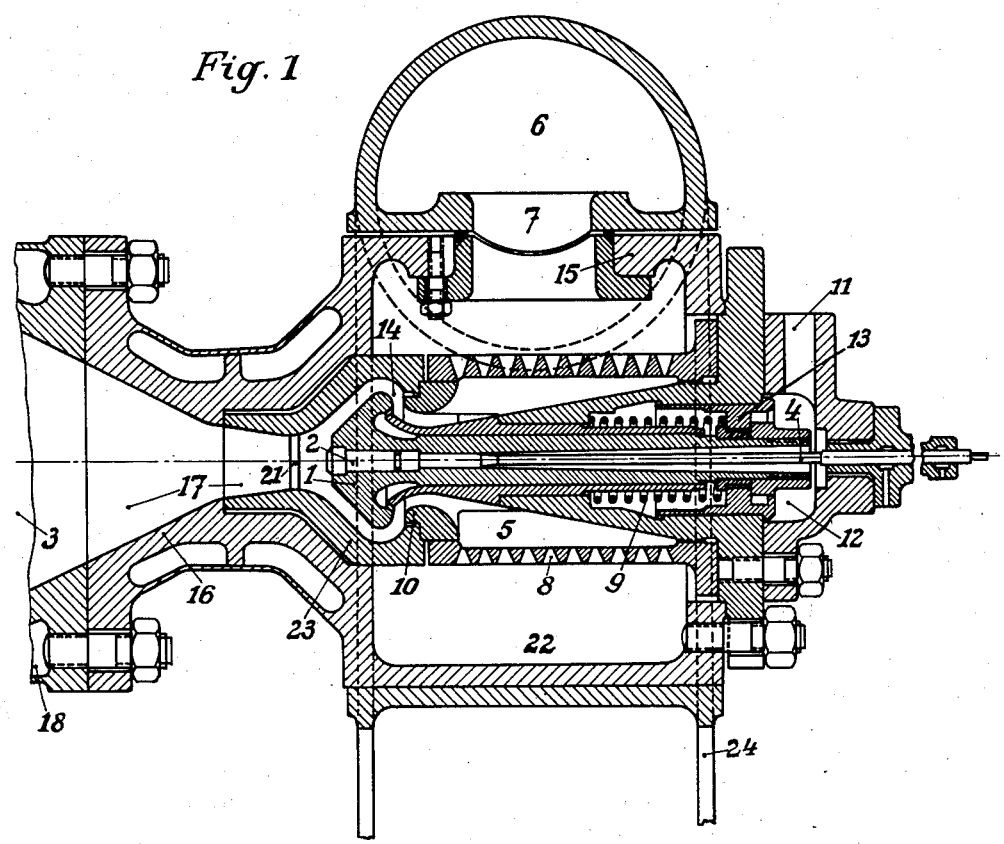

Aug. 6, 1935.   H. HOLZWARTH   2,010,020
EXPLOSION TURBINE
Original Filed Nov. 4, 1929   2 Sheets-Sheet 1

Inventor:
HANS HOLZWARTH
By
Attorney

Aug. 6, 1935.  H. HOLZWARTH  2,010,020
EXPLOSION TURBINE
Original Filed Nov. 4, 1929   2 Sheets-Sheet 2

INVENTOR
HANS HOLZWARTH
BY Joseph Hirschman
ATTORNEY

Patented Aug. 6, 1935

2,010,020

UNITED STATES PATENT OFFICE 2,010,020

EXPLOSION TURBINE

Hans Holzwarth, Dusseldorf, Germany, assignor to Holzwarth Gas Turbine Co., San Francisco, Calif., a corporation of Delaware Application November 4, 1929, Serial No. 404,688 Renewed September 12, 1933. In Germany November 13, 1928

8 Claims. (Cl. 60—41)

My invention relates to explosion turbines and more particularly to the explosion chambers thereof and to the arrangement and construction of charging mechanism for such chambers, whereby an efficient and economical operation of the turbine is secured.

In the operation of gas turbines of the intermittent explosion type, it is generally necessary to overcome two fundamental difficulties, before a uniform and economical operation of the turbine can be obtained. The first of these difficulties arises from the fact that the fuel and air must be intimately mixed to produce a combustible mixture within the very short time that is allotted to such mixing during each working cycle. If fuel atomizing air of a pressure of about 60 atm. is used, as in the classic Diesel engines, or if the fuel is injected by a pump at a pressure of about 300 atm., as in the modern compressorless Diesel engines, the atomization of the fuel presents no difficulty; however, the use of air compressors for the production of the atomizing air, or of high pressure fuel pumps, operates to complicate the plant and to increase the cost thereof. Furthermore, the safety of operation is reduced by the employment of such high pressures; for example, charging air of such high pressure leads easily to explosion of the lubricating medium, while in the high pressure fuel pumps the valve springs break after short operating periods. If, therefore, a gas turbine plant is to be constructed as simply as possible and to be operated with a maximum of safety, resort cannot be had to the high pressure mechanisms developed in the Diesel engine art to effect proper mixture of fuel and air.

The second difficulty which is encountered in the operation of explosion turbines involves the more or less complete scavenging of the explosion chamber of the residual combustion gases of the previous explosion. If the explosion chamber is not completely scavenged, two serious disadvantages arise. The first of these consists in the danger of pre-ignition caused by highly heated gas particles which remain in the chamber and ignite the new charge even while the latter is being introduced into the chamber; such pre-ignition is objectionable not only because it leads to weak and ineffective explosion, but also because it disturbs the uniform course of the explosion cycles. The second disadvantage results from the fact that, as in every explosion engine, the residual combustion gases remaining in the explosion chamber prevent the filling of such chamber with a full, new combustible charge and thus reduce the effective capacity of the chamber.

The present invention has for its object the overcoming of these difficulties, and aims to accomplish rapid and complete mixture of fuel and air without the aid of special compressors for the production of atomizing air or of high pressure oil pumps; the present invention aims also to accomplish substantially complete scavenging of the explosion chamber by means of the combustion supporting air itself and without the aid of a separate stream of scavenging air, whereby power is saved and the length of each explosion cycle reduced and the output of the turbine correspondingly increased.

In accordance with my invention, the explosion chamber is so constructed that both of the above-mentioned difficulties are solved in a very simple manner. Due to the peculiar shape of my novel explosion chamber and to the arrangement of the air and fuel inlet valves with respect thereto, a very intimate mixture of the fuel and air is obtained, while the charge of air for the next explosion is so fed into the explosion chamber that it serves also the function of driving out of the chamber the residual combustion gases of the previous explosion. I accomplish these results by making the chamber of elongated and substantially cylindrical form and so locating the air inlet valve that the air is fed into the chamber in an axial direction; at the same time I make the connection between the inlet valve and the cylindrical portion of the chamber of conical outline, so that the charging air, as a result of the diffuser action of such conical connection, undergoes a constant expansion over the width of the chamber and drives before it in the manner of a piston the residual combustion gases which escape through the open nozzle valve at the discharge end of the chamber. The charging air thus acts as an air buffer or piston which lies against the walls of the chamber, and as it advances in an axial direction pushes the residual gases out of the combustion chamber. Even if any gas particles should penetrate into the air buffer, they can have no harmful effect as the expanded air composing such buffer rapidly cools such particles and deprives the same of their igniting capacity.

In a further extension of the inventive idea I provide a constricted section in the connection between the explosion chamber proper and fuel and air inlet valves, the flow area of such constricted section being smaller than the outlet area of the air inlet valve and also smaller than the area of the passageways in advance of said valve. It is known that for highest efficiency of atomization of the fuel the relative velocities between the atomizing air and the fuel, that is, the algebraic difference of their velocities, should be kept as high as possible, and in the attempt to fulfil this condition the area which the air inlet valve exposes has heretofore been reduced to a minimum. In spite of the fact that a sufficient relative velocity between air and fuel appears to have been realized in this manner, there is obtained with the aid of the present invention so superior a mixing of air and fuel that a remarkable improvement in the efficiency of combustion is secured. The present improvement originates in part in the recognition of the fact that the walls of the conduit which lead the air from the air valve outlet to the point where it mixes with the fuel exert a braking action on the rapidly flowing atomizing or combustion air stream, such braking action so reducing the velocity of the latter that atomization occurs at below optimum conditions. In accordance with the present invention, the atomizing or combustion air, as a result of the constriction between the air valve outlet and the explosion chamber, reaches its highest possible velocity at just the point where mixing takes place; the relative velocity between fuel and air likewise attains its highest value at this point, so that the conditions most favorable for efficient atomization are created. Experiments have shown that in this manner the air velocities can be increased to above the velocity of sound, so that hitherto unattainable combustion efficiency is obtained.

The air velocity reached in the constricted section above referred to depends on the difference between the pressure of the atomizing or combustion air and the pressure prevailing in the explosion chamber. These pressures may not, however, be determined solely from the standpoint of atomization; they depend also on other unalterable conditions associated with the operation of an explosion turbine. The pressure of the air, for example, may not be raised above a definite value because otherwise the compressor apparatus would be of such size and require so much power as to render the plant uneconomical. The pressure in the combustion chamber, on the other hand, depends largely on the back pressure on the rotor.

In a further development of the inventive idea, in order to be independent of the fixed pressure drops for any turbine plant, I cause the walls to widen continually toward the explosion chamber from the constriction in the connection between the air valve outlet and the chamber, such widening walls acting as the diffuser of the Venturi nozzle so defined between the chamber and the valve. The static pressure in the constricted section thus becomes smaller than that in the chamber, so that in spite of a comparatively small pressure drop between the pressure of the air and that prevailing in the chamber, a pressure difference between the pressure of the air and that in said constricted section is created which produces the necessary relative velocities between air and fuel at the point of mixing. Very favorable results have been obtained when the cross-section of the constricted section was half as large as the outlet area of the inlet valve. The constricted section and the widening section are preferably located in a separate insert element so that it is possible to adjust the cross-section ratios to any combustion engines that have come into use and to other variable magnitudes connected with turbine operation.

If it is assumed, according to data obtained from actual test runs, that the pressure of the atomizing air is about 3.0 atm. gauge, then the pressure at the constricted section mentioned above is about 2.09 atm. gauge in a turbine of usual construction. The average pressure drop from 3.0 to 2.09 atm. corresponds to a gas velocity of about 228 m/sec. The average discharge velocity of the liquid fuel from the spray nozzles is about 13.5 m/sec., calculated upon the basis of the continuity law from the average plunger velocity, and the cross-sectional dimensions of the pump and spray openings. The average relative velocity between air and fuel is therefore about 215 m/sec. By reference to curves which indicate the relationship between the size of the atomized fuel droplets and the relative velocity between atomizing air and fuel (see Triebnigg "Der Einspritzung und Einblasevorgang bei Dieselmaschinen" p. 22) it will be found that under these conditions the average radius of the atomized fuel droplets is 0.0008 mm., while the surface area of a grain of atomized fuel is 2.6 sq. m. From Fig. 54 on page 120 of the book above referred to, it will be seen that in Diesel engines operating at a fuel pump pressure of 350 atm., the average size of fuel droplets is 0.011 mm. The degree of atomization attained with a gas turbine constructed in accordance with the present invention is therefore about 14 times better than that obtained in a modern Diesel engine, on the basis of a linear comparison of the fuel droplet diameter, in spite of the fact that I utilize a pump pressure of only 16 atm. gauge.

Figure 2:
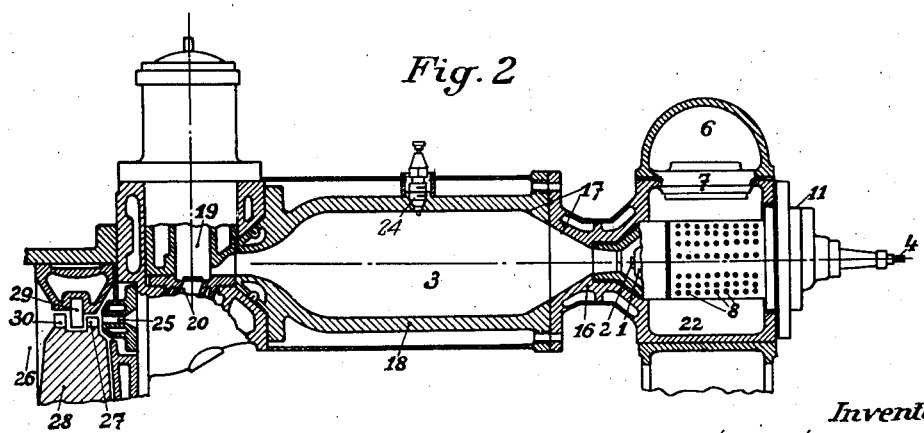

My invention will best be understood by reference to the accompanying drawings which shows by way of example a preferred form of the invention. In said drawings, Fig. 1 shows a longitudinal section through the air and fuel inlet valves and the inlet end of the explosion chamber; Fig. 2 is a view partly in longitudinal axial section through a combustion chamber, and shows also the nozzle valve and part of the turbine rotor and rotor housing; and Figs. 3 to 8 show the progressive phases of the air and fuel charging process, as described more fully hereinbelow.

Referring to the drawings, the numerals 1 and 2 indicate respectively the valve for admitting the atomizing, combustion or charging air and the valve for charging fuel into the explosion chamber 3. As shown, both these valves are located at one side of the chamber, and in the example illustrated they are arranged concentrically one within the other. The valve 2 is in the form of a check valve located in the head of valve 1 and is fed with liquid fuel through a conduit 4 by means of a pump (not shown) in a manner known in the art. The air is charged into the valve casing 5 from a conduit 6 through a connection 7 and through the braking nozzles 8, as described more in detail in my U. S. Patent No. 1,897,478, issued February 14, 1933. The air valve 1 is constantly urged toward its seat by a spring 9. To open the valve 1, oil under pressure is fed periodically through an oil conduit 11 from an oil distributor, which may be of the type described in my United States Patent No. 1,033,015; from this conduit the oil enters a space 12 and acts against a piston 13 fixed on the stem of the valve. As the valve opens against the pressure of the spring 9, the outlet opening 14 is exposed, as indicated in Fig. 1, where the valve is shown in open position. All the parts of the valve are enclosed within a housing 22 to which the explosion chamber 3 is connected through a connecting piece 16.

In accordance with the present invention, the walls of the passageway leading from the axially disposed concentric valves 1 and 2 to the cylindrical walls 18 of the explosion chamber proper are made of conical form, so that the charging air stream continually expands along the width of the chamber as a result of the diffuser effect of such conical connection and drives out the residual combustion gases remaining from the previous explosion through a nozzle valve 19 which was opened shortly after such previous explosion, preferably by means of oil under pressure in a manner similar to the control of valve 1. As set forth in my copending application Serial No. 297,799, filed Aug. 6, 1928, of which the present application is in part a continuation, the expansion of an exploded charge is permitted to proceed to or approximately to a pressure corresponding to the pressure of the charging air (which is preferably above the exhaust pressure of the turbine), at which point of expansion the air valve 1 is opened by its pressure oil distributor and air introduced into the combustion chamber. As stated above, this air assumes the form of a piston and drives the residual combustion gases before it through the open nozzle valve, the latter being kept open until the last particles of residual gases are driven into the nozzle channel 20 and the advance portion of the air stream reaches the nozzle valve, whereupon the nozzle valve is closed, while air continues to be charged into the chamber to make up the combustion supporting air charge. During this latter charging, the fuel is introduced into the air stream, or it may be injected into the air before the nozzle valve closes, and becomes intimately mixed with the air, so that an efficient explosion is insured. This intimate mixing is effected through the medium of a constricted section 21 located in the connection between the explosion chamber and the valves 1 and 2, the flow area through such constricted section being smaller than the maximum outlet area 14 of the air valve and of the conduits 5, 8, 22, 7 and 6 in advance of such valve. This constriction at the point described creates the greatest relative velocity between the air and the fuel at exactly the point where mixing of these two media takes place, so that the optimum conditions for atomization are afforded. In the form of the invention illustrated the conical walls 16 lead directly to such constriction, so that the conical connection defined by such walls acts as the diffuser of the Venturi nozzle 14, 21, 17, and at the same time aids in imparting the form of a piston to the stream of combustion supporting air first entering the chamber. In this manner the pressure prevailing in the constricted section 21 is made quite independent of the pressure in the explosion chamber 3. The Venturi nozzle 14, 21, 17 may be embodied in a separate insert 23 in the valve casing 15, in the connecting piece 16, or in the turbine frame 24, so that the ratios between the cross-sections 21, 17 can be altered without changing other parts of the explosion turbine and adjusted to any variable magnitudes connected with the operation of the turbine.

Figure 3:
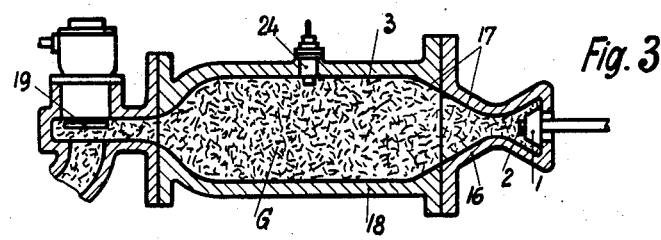
Figure 4:
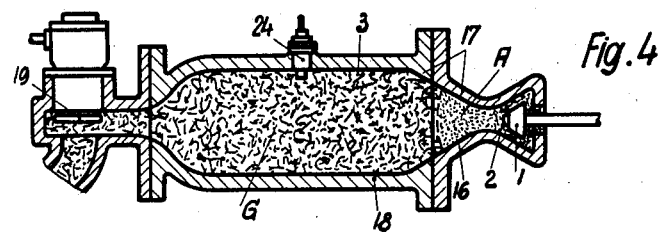
Figure 5:
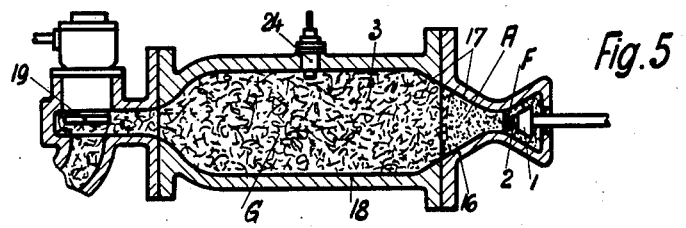
Figure 6:
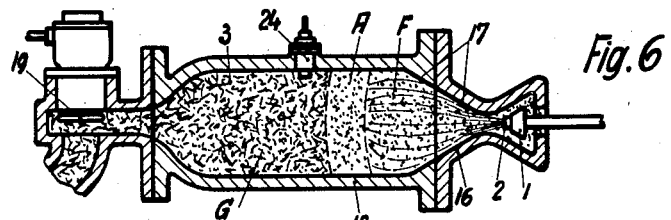
Figure 7:
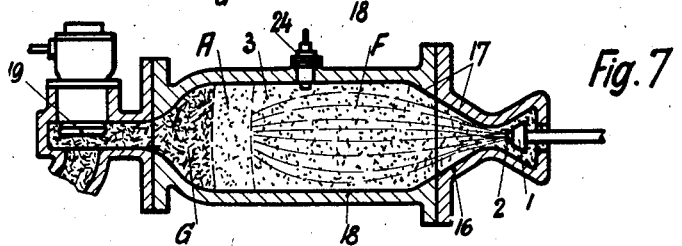
Figure 8:
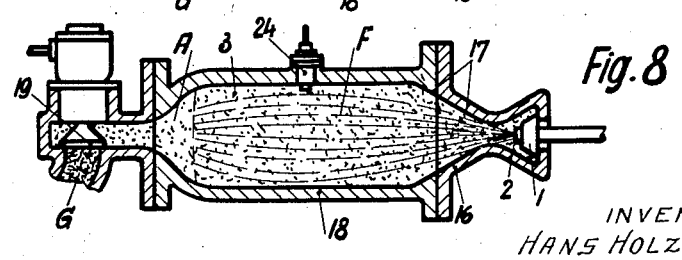

Fig. 2 shows the general arrangement of the explosion chamber with the inlet valves at one side and the nozzle valve at the other side thereof. The combustible charge which is fed into the chamber in the manner described above is ignited by means of a spark plug or other igniting mechanism located at 24. Shortly after the explosion, the nozzle valve 19 is opened and the products of combustion enter the channel 20 and expand through a nozzle 25 extending into the rotor housing 26 and are discharged against the first series of blades 27 of a rotor 28. The gases are reversed by stator blades 29 and directed against the second set of rotor blades 30 and are then either discharged into the atmosphere or utilized in any suitable manner. Figs. 3 to 8 inclusive show graphically the conditions in the explosion chamber during the scavenging and charging of the latter. Fig. 3 illustrates the condition of the valves 1 and 19 during the expansion of the explosion gases out of the chamber, the air valve 1 being closed and the valve 19 being open, the residual gases in the chamber being represented by the irregular markings G. When the gases have expanded in the chamber to a more or less predetermined value, the air valve 1 is opened, as indicated in Fig. 4 whereupon a body of air, indicated by the stippling A, enters the chamber and pushes the residual gases before it. This figure indicates clearly the dividing zone or boundary between the incoming air and the retreating gases. Fig. 5 shows the beginning of the fuel injection, the fuel being indicated by the more or less horizontal lines F, Fig. 6 showing the more or less definite boundary between the initially introduced body of pure air and the mixture of fuel and air indicated at F. It will be seen that the body of pure air A acts as a buffer between the hot residual gases G and the combustible mixture F. Figs 7 and 8 show how this buffer of air A is maintained during the subsequent course of the charging until, when such air buffer has reached the outlet end of the chamber, the nozzle valve 19 and also the air valve 1 are closed. In this manner the residual gases are expelled to any degree of completeness desired by a body of air shaped and acting as a piston, preignition being prevented by the air buffer A between the residual gases and the fuel.

Variations may be resorted to within the scope of the appended claims without departing from the spirit of the invention.

I claim:

1. In an explosion turbine, in combination, an explosion chamber of substantially cylindrical form, a nozzle valve at the outlet end of said chamber, and an air charging valve arranged to charge air into said chamber in an axial direction, the connection defining the passageway from the air valve to the space defined by the cylindrical walls of the chamber including a section of conical form, whereby the mass of air charged by such valve spreads continuously over the width of such chamber as a result of the diffuser effect of said conical section and in the manner of a piston drives out the residual gases remaining from the previous combustion through the nozzle valve.

2. The combination as set forth in claim 1, wherein said connection defines a constricted passageway between said valve and the interior of the explosion chamber, said passageway presenting a smaller flow area than the outlet flow area of the air inlet valve and the flow areas for the air in advance of the valve.

3. The combination as set forth in claim 1, wherein said connection defines a constricted passageway between said valve and the interior of the explosion chamber, said passageway presenting a smaller flow area than the outlet flow area of the air inlet valve and the flow areas for the air in advance of the valve, the inlet end of the combustion chamber being in the form of a Venturi nozzle, the conical section of such connection acting as the diffuser of the said nozzle, and the smaller cross-section of the latter occurring at said constricted passageway.

4. The combination as set forth in claim 1, wherein said connection defines a constricted passageway between said valve and the interior of the combustion chamber, the flow area at such constricted passageway being about half that of the outlet of the air valve.

5. The combination as set forth in claim 1, wherein said connection is in the form of a separate insert located within the inlet end of the chamber.

6. In an explosion turbine, in combination, an explosion chamber of elongated form substantially cylindrical along the main portion thereof, a nozzle valve at the outlet end of said chamber, and an intermittently operating air charging valve at the other end of said chamber arranged to charge air thereinto periodically in an axial direction, the inlet end of said chamber converging from said valve to a point of minimum cross-section of smaller flow area than the outlet of such valve and then widening in conical fashion to the cylindrical section of said chamber, whereby the mass of air charged by said inlet valve is given a high velocity at said point of minimum cross-section and assumes the form of a piston as it traverses the conical portion of the chamber so that it drives before it the residual gases remaining from the previous explosion.

7. The method of operating an elongated, constant volume explosion chamber having a main substantially cylindrical body section and controlled fuel and air inlet members and a controlled discharge member and arranged to deliver the explosion gases, before they have done external work, to an expansion nozzle, said method comprising charging into said chamber air at a pressure considerably above the back pressure on the chamber, admitting fuel into the chamber, exploding the mixture of air and fuel while the chamber is completely closed, opening the discharge member to effect escape of the high pressure explosion gases into the expansion nozzle, the pressure in said chamber diminishing as the discharge of gases proceeds, interrupting the further expansion of the gases in the chamber when the gases reach the above-defined pressure of the charging air and at such instant opening the air inlet member and forcing air into the chamber at said above-defined pressure, the incoming air thereby meeting a body of gases of substantially the same pressure as its own and thereupon, aided by the shape of the chamber, assuming the form of a piston and driving before it the residual body of gases without whirling and mixing with such gases to any considerable extent, there being formed a well-defined dividing zone between the gases and the air, and then closing the discharge member when the said dividing zone reaches the same.

8. In a constant volume explosion turbine plant, the combination of a constant volume explosion chamber, valved means for introducing into said chamber compressed air of a pressure considerably above the back pressure on the chamber, a fuel inlet member, a discharge valve at the opposite outlet end of the chamber, an expansion nozzle connected with said discharge valve, means for exploding a mixture of fuel and air in said chamber, control mechanism for the inlet and discharge valves of the chamber, said control mechanism operative after an explosion and opening of the discharge valve, followed by expansion of the explosion gases out of the chamber, to open the air inlet valve at the instant at which the explosion gases have expanded in the chamber to substantially the above-defined pressure of said air to cause a stream of air to travel longitudinally of the chamber, the chamber being so shaped and the incoming air meeting a body of gases of so nearly the same pressure as its own that said air assumes the form of a piston and drives before it the no longer expanding residual gases, such gases continuing their expansion outside the chamber, said control mechanism closing the exhaust valve when the dividing zone between the air and gases reaches such valve.

HANS HOLZWARTH.